Aug. 29, 1944.   R. J. KENT   2,357,118
LINEMAN'S CABLE CAR
Filed Dec. 28, 1940   2 Sheets-Sheet 1

INVENTOR
R. J. KENT
BY J. MacDonald
ATTORNEY

Aug. 29, 1944.                R. J. KENT                2,357,118
                        LINEMAN'S CABLE CAR
                       Filed Dec. 28, 1940              2 Sheets-Sheet 2
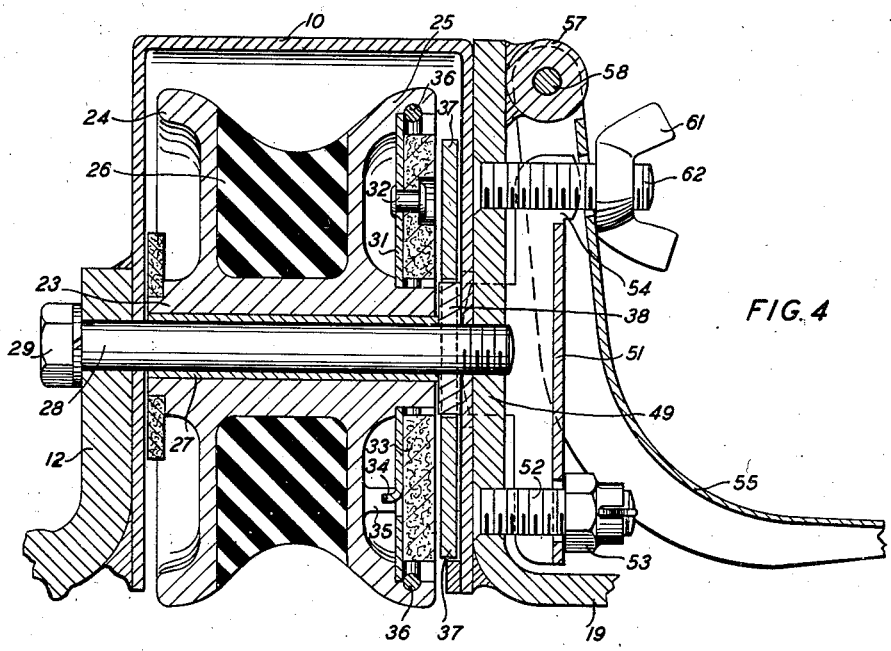
FIG. 4
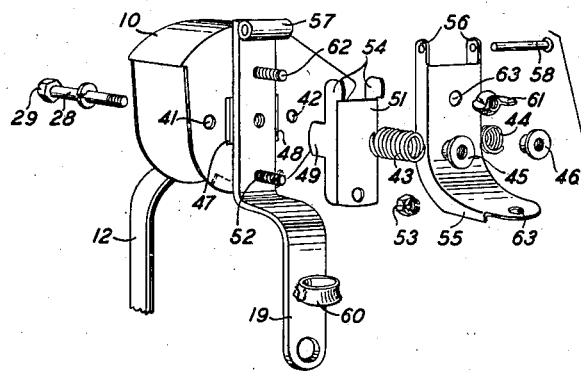
FIG. 5
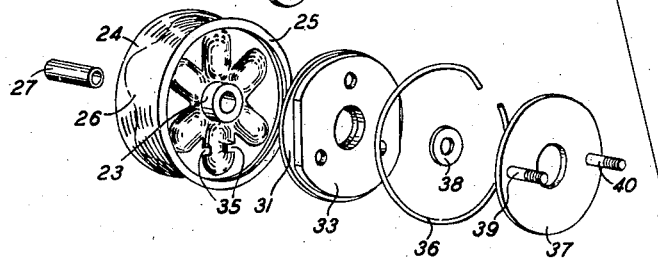
INVENTOR
R. J. KENT
BY J. MacDonald
ATTORNEY Patented Aug. 29, 1944

2,357,118

UNITED STATES PATENT OFFICE 2,357,118

LINEMAN'S CABLE CAR

Robert J. Kent, Summit, N. J., assignor to Bell Telephone Laboratories, Incorporated, New York, N. Y., a corporation of New York Application December 28, 1940, Serial No. 372,210

1 Claim. (Cl. 74—230.7)

This invention relates to cable cars or linemen's chairs of the type adapted to be mounted and moved along a messenger or cable supporting strand.

An object of this invention is to improve the construction and increase the safety factor of such devices.

A feature of this invention is the provision of an improved sheave or wheel for supporting the car on the strand.

Referring to the drawing, in which one embodiment of my invention is illustrated, Fig. 1 is a view in perspective of my improved cable car in position on a fragment of strand or wire;

Fig. 4 is an enlarged cross-sectional view taken on line 4—4 of Fig. 3;

Fig. 5 is an exploded view in perspective of the structure shown in Fig. 4; and

Figure 1:
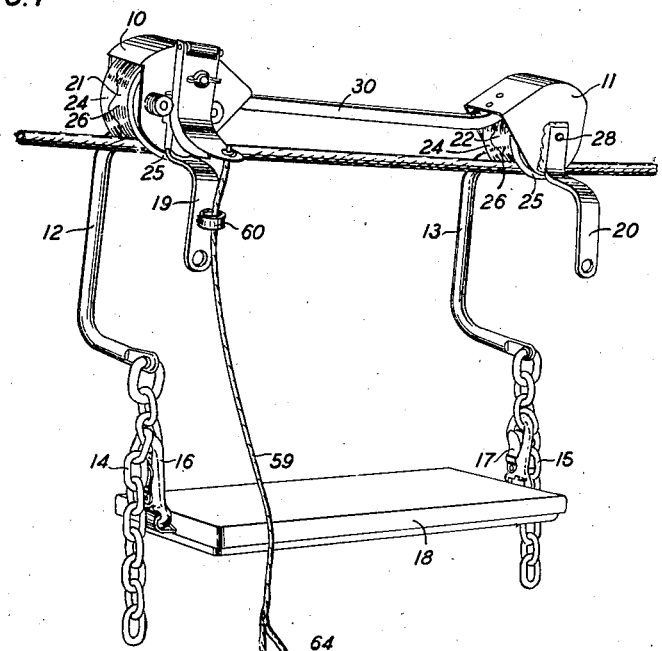

As shown in Fig. 1 the lineman's car of this invention comprises a pair of yokes or housings 10 and 11 which are provided with rearwardly extending arcuate arms 12 and 13 which extend downwardly therefrom and have secured thereto, by means of suitable link members 14 and 15 and snap hooks 16 and 17, a rectangular seat member 18.

Secured to the front faces of the yokes 10 and 11 are the downwardly extending arms 19 and 20, each of which is provided with an aperture for securing thereto a lineman's safety belt (not shown).

Figure 6:
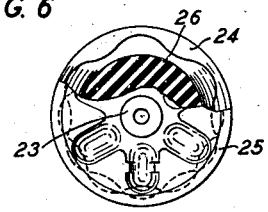
Fig. 6 is a side view, partly in section, of the sheave.

Located in the yokes 10 and 11 are the sheaves 21 and 22. These sheaves comprise a hub portion 23 and side flanges 24 and 25. Located between the side flanges 24 and 25 is positioned a rubber insert or ring 26. A bushing 27 is positioned in the hub 23 and forms a bearing surface for the sheave. A bolt 28 having a head 29, extends through the bushing 27 and is threadedly secured into the arms 19 and 20 at the front of the car. As shown in detail in Fig. 6 the joints between the flanges 24 and 25 and the rubber ring 26, instead of being in the conventional straight form, have a wavy or irregular configuration which eliminates or materially reduces the possibility of the strand wedging itself in between the flanges 24 and 25 and the insert 26 as the sheave traverses the strand.

The sheaves 21 and 22 and their supporting yokes 10 and 11 are interconnected in spaced alignment by means of the member 30 which may be secured to the yokes in any suitable manner, for example, by riveting or welding.

Figure 2:
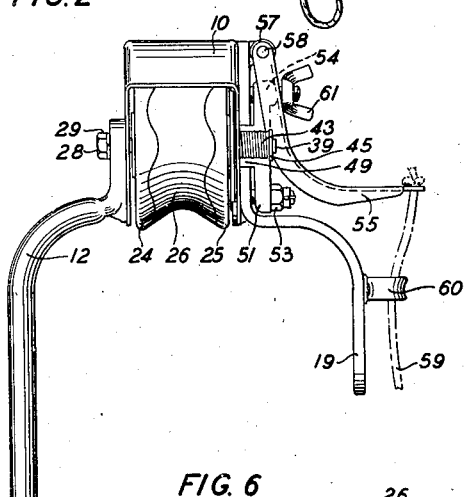
Fig. 2 is an enlarged end view of the sheave and brake mechanism.
Figure 3:
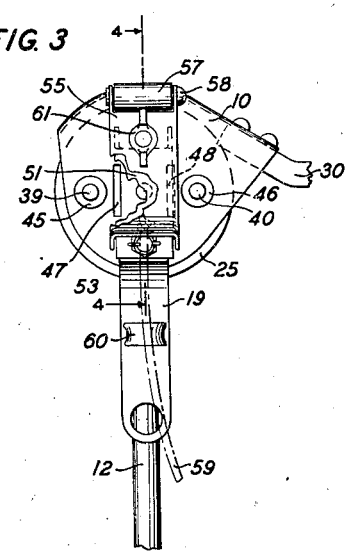
Fig. 3 is an enlarged side view, with parts broken away, of the sheave and brake mechanism in Fig. 2.

As shown in Figs. 1 to 3, inclusive, and more in detail in Figs. 4 and 5, the sheave 21 has been provided with a positive acting brake which features among other improvements a large braking surface. This brake is under the control of the occupant of the car and may be applied intermittently to slow down the car or it may be locked in position to prevent movement thereof.

By referring to Fig. 4 it will be observed that the rotating portion or brake disc comprises an apertured metal plate 31 fitted over the hub 23, this plate having secured to its outer face, by means of the rivets 32, a disc of brake lining fabric 33. The metal plate 31 is fixedly secured to the sheave 21 by means of the lugs 34 which register with the apertures 35—35. A spring ring 36 fits into a groove in the flange of the sheave and prevents the displacement of the metal plate 31 and its fabric disc 33. Thus the fabric disc and its associated parts are firmly secured to and made part of the rotatable sheave 21.

Spaced away from the fabric disc 33 and located adjacent the side of yoke member 10, is the metal plate 37. This plate is adapted to be moved axially with respect to the fabric disc 33 and is provided with a central aperture which fits over a washer or bushing 38 located on the bolt 28 between the end of the hub 23 and the inside surface of the yoke 10.

The metal plate 37 is provided with a pair of studs 39 and 40 which register with apertures 41 and 42 located in the yoke 10, which act as guide means for the plate 37. The plate 37 is maintained in its retracted position by normally expansible springs 43 and 44 which fit over the studs 39 and 40 and are positioned between the outside surface of the yoke 10 and the nuts 45 and 46 which are secured to the end of the studs 39 and 40.

Located in the yoke 10 on each side of the arm 19 are the elongated slots 47 and 48. Registering with these slots and extending therethrough and bearing against the outer surface of the plate 37 are the ears 49 of the member 51 which in turn is pivotally mounted on the arm 19 by means of the stud 52 and the nut 53. The member 51 is provided at its top portion with a pair of upstanding ears or lugs 54—54 adapted to be engaged by the rear surface of the channel-shaped arcuate lever 55. The lever 55 is provided, at its top, with apertured ears 56—56 which are arranged to be positioned on either side of the sleeve 57 which in turn is secured to the upper end of the arm 19. A pin 58 passes through the apertures in the ears 56—56 and the bore of the sleeve 57 to provide a hinge for the lever 55.

A rope 59, or some other suitable means, may be secured to the bottom portion of the lever 55 and passed through the guide member 60 on the arm 19 for the operation of the lever 55 which when actuated bears against the ears 54—54 thereby causing the member 51 to be depressed. The depression of this member causes the ears 49 to bear against the plate 37 and force it, against the tension of the springs 43 and 44, into contact with the fabric disc 33.

The lever 55 may be locked in position by means of the wing nut 61 which engages the end of the stud 62 which is secured to the arm 19 and passes through an aperture 63 located in the lever 55. A loop 64 may be provided in the free end of the rope 59 so that the brake may be actuated by means of the foot of the person occupying the chair.

I do not limit myself to the specific type of cable car shown as it is obvious that modification and changes may be made therein by one skilled in the art and that I am only limited by the scope of the appended claim.

What is claimed is:

In a lineman's cable car, a hanger assembly including a wheel adapted to traverse a suspended cable, said wheel comprising a metal hub member having spaced integral flanges flared at their peripheries, and a ring of tough resilient material confined between said flanges, the outer surface of said ring being shaped to form with portions of the peripheries of said flanges a curved composite bearing surface for said cable, the inner surfaces of said flanges and the sides of said ring being corrugated, the corrugations extending slightly into the flared peripheral portions of said flanges, whereby the joints between said ring and the peripheral portions of said flanges have wave-like configurations thereby preventing the cable from forcing itself in between the ring and said flanges.

ROBERT J. KENT.